US011774967B2

(12) United States Patent
Alves et al.

(10) Patent No.: US 11,774,967 B2
(45) Date of Patent: Oct. 3, 2023

(54) SYSTEM AND METHOD FOR AUTONOMOUSLY MONITORING HIGHLY AUTOMATED VEHICLE OPERATIONS

(71) Applicant: Honeywell International Inc., Charlotte, NC (US)

(72) Inventors: Erin Elizabeth Alves, Phoenix, AZ (US); Lisa Fern, Seattle, WA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/664,185

(22) Filed: May 19, 2022

(65) Prior Publication Data

US 2022/0276651 A1    Sep. 1, 2022

Related U.S. Application Data

(63) Continuation of application No. 16/522,149, filed on Jul. 25, 2019, now Pat. No. 11,366,468.

(51) Int. Cl.
*G05D 1/00* (2006.01)
*B64C 19/00* (2006.01)
(Continued)

(52) U.S. Cl.
CPC ........... *G05D 1/0088* (2013.01); *B64C 19/00* (2013.01); *G07C 5/02* (2013.01); *G07C 5/08* (2013.01);
(Continued)

(58) Field of Classification Search
CPC ................. G05D 1/0088; B64C 19/00; B64C 2201/141; B64C 2201/146; G07C 5/02; G07C 5/08
See application file for complete search history.

(56) References Cited

U.S. PATENT DOCUMENTS 7,302,316 B2    11/2007  Beard et al.
9,946,531 B1 *   4/2018  Fields ................... G08B 25/10
(Continued)

FOREIGN PATENT DOCUMENTS

CN           113511217 A  * 10/2021  ............ B60W 30/16

OTHER PUBLICATIONS

Ancel, In-Time Non-Participant Casualty Risk Assessment to Support Onboard Decision Making for Autonomous Unmanned Aircraft, AIAA AVIATION Forum, Jun. 17-21, 2019, 1-13 (Year: 2019).*
(Continued)

*Primary Examiner* — Elaine Gort
*Assistant Examiner* — Anthony M Gartrelle
(74) *Attorney, Agent, or Firm* — Bookoff McAndrews, PLLC

(57) ABSTRACT

Systems and methods are disclosed for monitoring operations of an autonomous vehicle. For instance, a monitoring device receives sub-system data from one or more sub-systems of the autonomous vehicle. The device receives contextual data of the vehicle that comprises one or more situational circumstances of the vehicle during operation. The device receives control data from a control system of the vehicle and analyzes the sub-system data, the contextual data, and the control data to determine a control result. The device provides an assessment to a management system of the overall control status of the vehicle.

20 Claims, 6 Drawing Sheets

(51) Int. Cl.
*G07C 5/02* (2006.01)
*G07C 5/08* (2006.01)

(52) U.S. Cl.
CPC ...... *B64U 2201/10* (2023.01); *B64U 2201/20* (2023.01)

(56) References Cited

U.S. PATENT DOCUMENTS

| | | |
|---|---|---|
| 10,156,848 B1* | 12/2018 | Konrardy ................. G08G 1/20 |
| 2016/0370800 A1 | 12/2016 | Chau et al. |
| 2017/0269611 A1 | 9/2017 | Rangarajan |
| 2017/0300054 A1* | 10/2017 | Hanson ..................... B60F 5/02 |
| 2018/0224848 A1 | 8/2018 | Vieux |
| 2019/0220011 A1 | 7/2019 | Della Penna |
| 2020/0189591 A1* | 6/2020 | Mellinger, III ........ B62D 6/003 |
| 2020/0346641 A1* | 11/2020 | Woon ................ B60W 60/0011 |

OTHER PUBLICATIONS

Brittain, Autonomous Separation Assurance in An High-Density En Route Sector: A Deep Multi-Agent Reinforcement Learning Approach, 2019, IEEE Intelligent Transportation Systems Conference (ITSC), 3256-3262 (Year: 2019).*

* cited by examiner

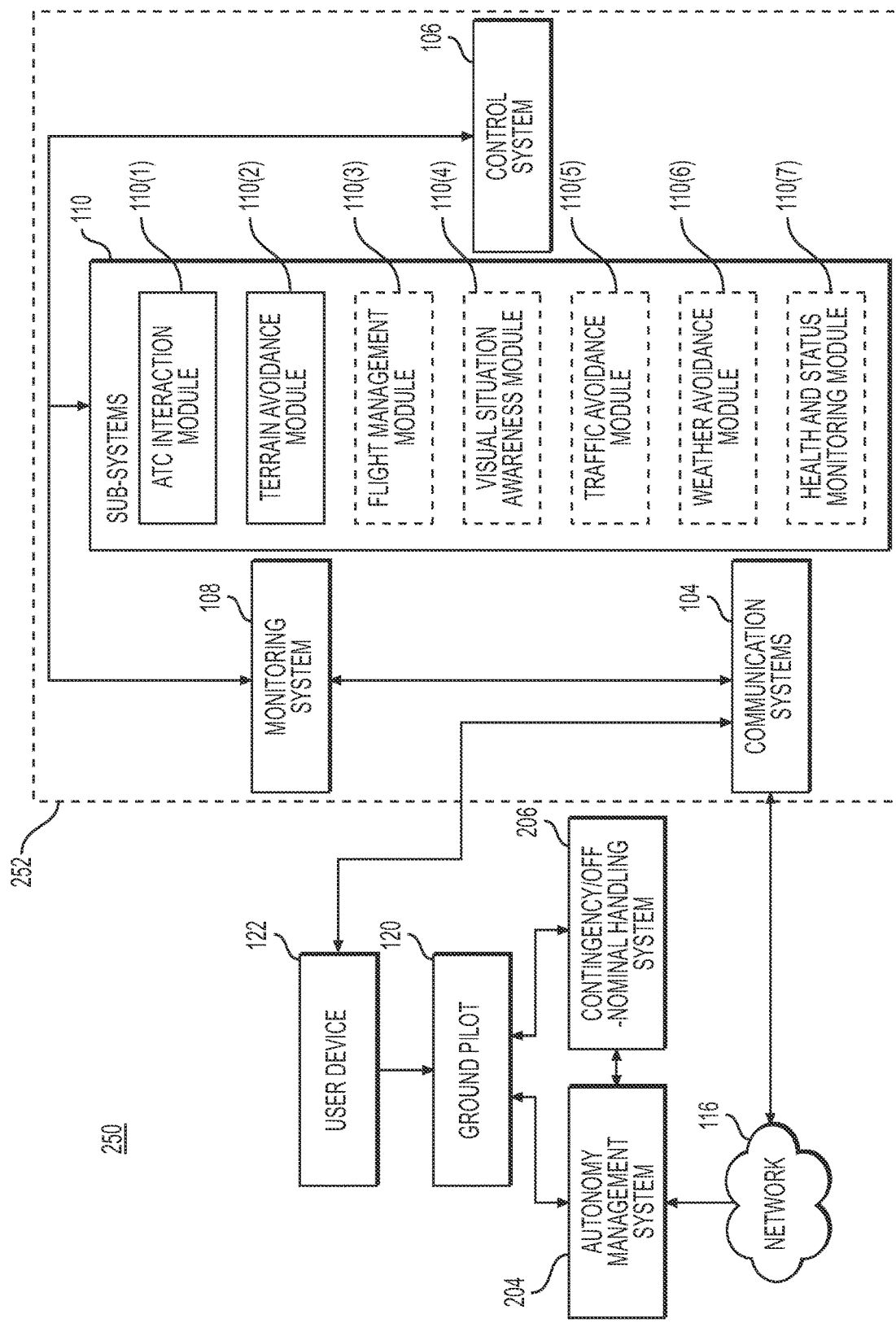

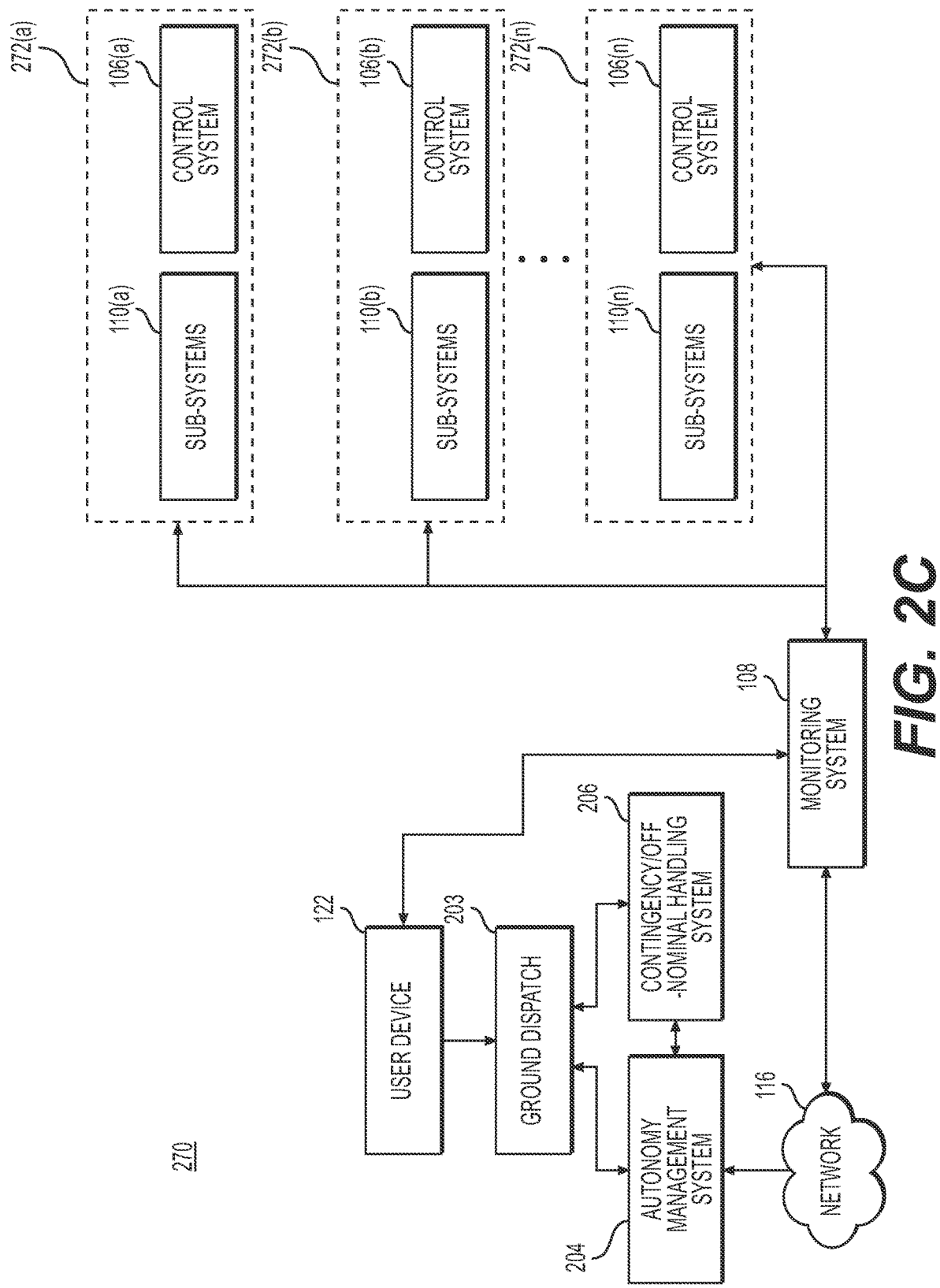

SYSTEM AND METHOD FOR AUTONOMOUSLY MONITORING HIGHLY AUTOMATED VEHICLE OPERATIONS

CROSS-REFERENCE TO RELATED APPLICATION(S)

This patent application is a continuation of and claims the benefit of priority to U.S. application Ser. No. 16/522,149, filed Jul. 25, 2019, the entirety of which is incorporated herein by reference.

TECHNICAL FIELD

Various embodiments of the present disclosure relate generally to monitoring operations and controls in vehicles and, more particularly, to monitoring control systems and data systems in vehicles for facilitating safe, effective, and efficient decision making for vehicle operations.

BACKGROUND

Vehicles of all types are becoming increasingly complex, as they are fitted with network connections, automated operation components (e.g., "auto-plot" or "self-driving features"), connected safety and security features, and the like. As processing systems and sub-systems increasingly automate vehicle operations, control and navigation systems make sophisticated decisions that would otherwise be made by human navigators. Often these systems are intended to mimic human interaction and decision making. As an example, some auto-pilot features of aircraft vehicles are intended to replicate onboard human pilot and operator procedures. As these automated systems become increasingly complex, it is possible for failures to occur, particularly in situations where the systems cannot adequately mimic a human control response in a complex and unexpected circumstance.

The present disclosure is directed to systems and methods for addressing these goals and interests. Thus, techniques discussed herein disclose systems and methods for autonomously monitoring highly automated passenger aircraft operation.

SUMMARY OF THE DISCLOSURE

The present disclosure is directed to techniques including systems, methods, computer readable media, and system devices for autonomous or near autonomous monitoring of highly automated vehicle operations.

For instance, the method may include receiving, by a monitoring device in communication with an autonomous vehicle, sub-system data from one or more sub-systems of the autonomous vehicle; receiving contextual data of the vehicle that comprises data of one or more situational circumstances of the vehicle during operation; receiving control data over the network from a control system of the vehicle; analyzing the sub-system data, the contextual data, and the control data to determine a control result; and providing an assessment to a management system of the overall control status of the vehicle based on the analyzing.

The system for monitoring operations of the autonomous vehicle may include a monitoring device with an interface unit configured to receive information, a data storage device (e.g., memory) storing instructions associated with vehicle data systems and a processor. The processor may be configured to execute the instructions to: receive sub-system data from one or more sub-systems of the autonomous vehicle; receive contextual data of the vehicle, wherein the contextual data comprises data of one or more situational circumstances of the vehicle during operation; receive control data from a control system of the vehicle; analyze the sub-system data, the contextual data, and the control data to determine a control result; and provide an assessment to a management system of the overall control status of the vehicle.

The non-transitory computer-readable medium stores instructions that cause the monitoring system to perform operations. The instructions may cause the processor to receive sub-system data from one or more sub-systems of the autonomous vehicle; receive contextual data of the vehicle, wherein the contextual data comprises data of one or more situational circumstances of the vehicle during operation; receive control data from a control system of the vehicle; analyze the sub-system data, the contextual data, and the control data to determine a control result; and provide an assessment to a management system of the overall control status of the vehicle based on the analyzing.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated herein and constitute a part of this specification, illustrate various exemplary embodiments and together with the description, serve to explain the principles of the disclosed embodiments.

FIGS. 2A-2C depict example embodiments of a system for automatic aircraft control monitoring, according to techniques presented herein.

DETAILED DESCRIPTION OF EMBODIMENTS

Figure 1:
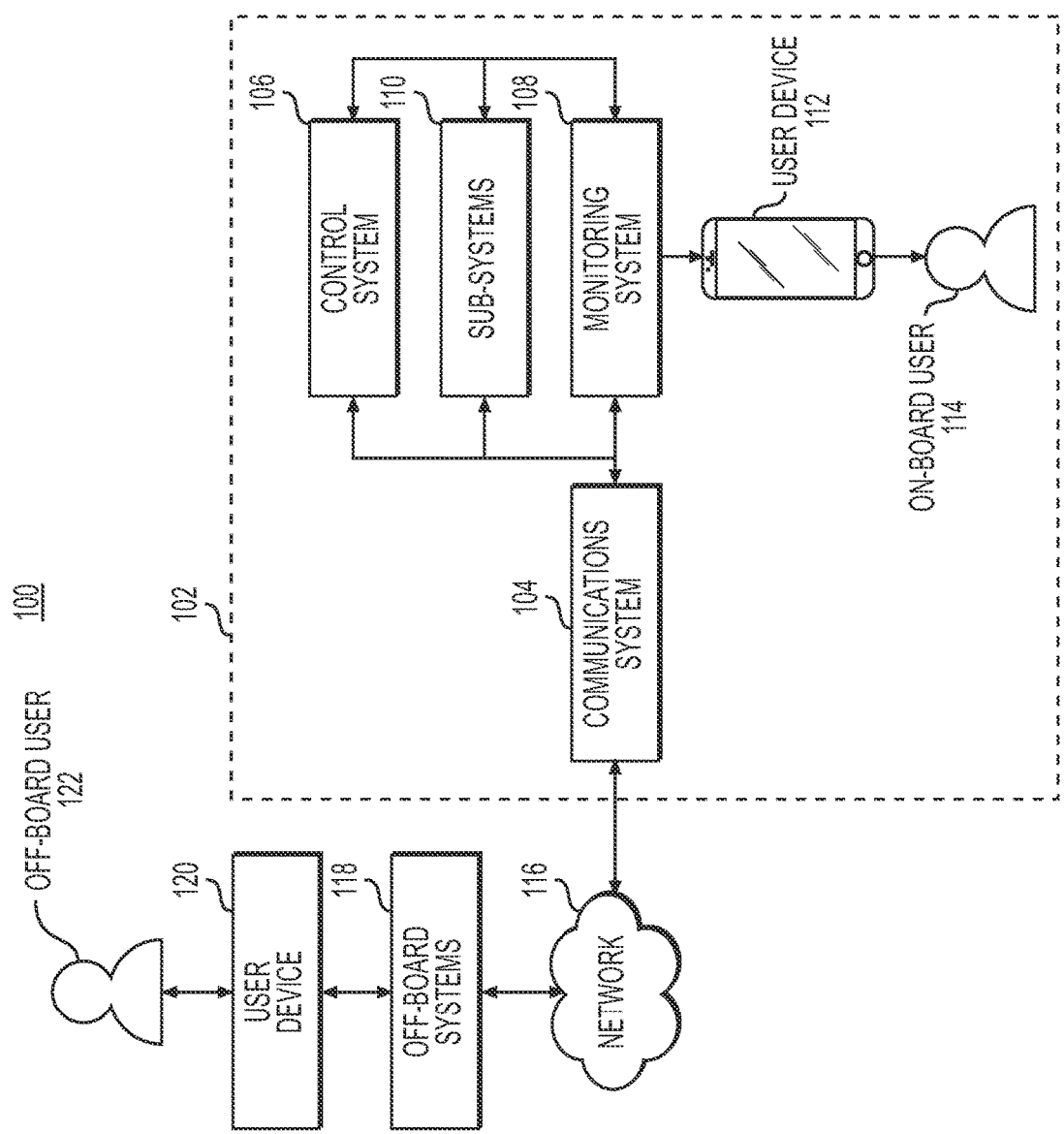
FIG. 1 depicts a network environment comprising a system for aircraft communications and automatic aircraft control monitoring, according to techniques presented herein.

Various embodiments of the present disclosure relate generally to monitoring autonomous vehicles, more particularly, to monitoring operations in aircrafts to assess aircraft control performance.

In general, the present disclosure is directed to use of an automated aircraft system to act as a pilot monitoring system to provide a level of supervisor redundancy for flight controls and operations. Traditionally, air operations are divided into components to be performed by various flight crew members with different responsibilities. Typical tasks, responsibilities, and authority principles (e.g., in a commercial flight context) are divided into pilot flying/pilot in command (herein "PF" and "PIC") components and pilot monitoring (herein "PM") components. Regardless of individual flight crew titles or ranks (e.g., Captain or First Officer), there is a clear delineation of duties between members of the flight crew. Often, the designated PF assumes ultimate responsibility for handling of the aircraft, while the PM monitors aircraft and sub-systems performance, handles communications, and generally oversees proper procedure. The PM is often expected to alert the PF when there is a system fault or failure, to query the PF in case of an erroneous or unexpected control action, and to recommend or engage with the PF to determine a next appropriate action in a given scenario. Thus, the PM provides redundancy for the PF, the primary purpose of which is to combine and incorporate situational awareness of both the PF and PM into a shared mental model. This is intended to facilitate safe and effective decision-making for operation of the aircraft.

In modern air passenger systems, flight crew responsibilities are becoming increasingly automated. For example, automated vehicle systems may perform operations typically performed by the PF. These systems may be referred to herein as Automation Flying or "AF" systems. The AF systems may leverage artificial intelligence (AI) and machine learning (ML) data analysis and processes to control an aircraft. In such scenarios, the human pilot/aircraft operator may have a more passive role than that of a human PM in a two-person crew. However, a shared mental model between the AF and a monitoring system is still desired for effective operation of the aircraft. For example, in an Urban Air Mobility (UAM) environment, there exists a need for software architectures that support an automated flight crew with limited to no human supervision. A standalone automation architecture that mimics current manned flight deck operations provides a level of redundancy in awareness and decision-making that will enhance the safety and efficiency of semi- and highly-automated flight.

Thus, an automated system is needed to act as a PM to complement the AF system. This automated system may be referred to herein as an Automation Monitoring or "AM" system. Like the AF system, the AM system may leverage AI and ML analysis and processes to provide the monitoring functionality. When an AM is implemented to act as a PM, the AM may be configured to provide the same level of supervisory redundancy as in current commercial flight operation procedures. The techniques herein propose examples of an AF/AM system. In one example, the AF/AM system consists of a hierarchical pervasive monitoring system to assess individual aircraft sub-systems, the state of decision-making of the AF, aircraft attitude and environmental factors, and intelligent data integration at a holistic system level to provide suggestions and recommendations to the AF as necessary.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

While this disclosure describes the systems and methods with reference to aircraft (e.g., aircraft primary avionics systems), it should be appreciated that the present systems and methods are applicable to security of any vehicle management system, including those of drones, automobiles, trains (locomotives), or any other autonomous and/or Internet-connected vehicle.

Reference is now made to FIG. 1 which shows an example networked environment and system/infrastructure for aircraft communications and automatic aircraft control monitoring, according to the techniques presented herein. FIG. 1 depicts an infrastructure 100 for monitoring aircraft systems. FIG. 1 shows an aircraft 102. FIG. 1 also shows several systems in the infrastructure 100. Some systems are on-board the aircraft 102, and some systems are off-board the aircraft 102. In FIG. 1, the systems on-board an aircraft include a communications system 104, control system 106, monitoring system 108, and sub-systems 110. The aircraft 102 also has an onboard user device 112 and an onboard user 114 (e.g., a pilot or flight crew member). FIG. 1 shows the aircraft 102 in communication with a network 116 via the communications system 104. FIG. 1 also shows off-board systems 118, an off-board user device 120, and an off-board user 122 (e.g., an off-board pilot, flight crew member, or controller).

It should be appreciated that though FIG. 1 shows certain systems as being on-board the aircraft 102, one or more of these systems may be off-board the aircraft 102. For example, one or more of the control system 106, the monitoring system 108, and the sub-systems 110 are represented in FIG. 1 as on-board systems, but one or more of (or even all of) control system 106, the monitoring system 108, and the sub-systems 110 may be located off-board the aircraft 102. It should be appreciated that any of the systems described herein may reside as logic or computer readable instructions (e.g., software or firmware) stored on one or more physical devices (not shown in FIG. 1). The logic and/or computer readable instructions may be executed by a processor on the one or more physical devices to perform functionality of the systems, including the systems and methods as described herein.

In FIG. 1, the control system 106, the monitoring system 108, and the sub-systems 110 are in communication with each other and with the communications system 104. The monitoring system 108 is also in communication with the on-board user device 112, which is configured to communicate with the on-board user 114. The on-board user device 112 may be any type of computer device that is configured to communicate with the on-board user 114, either directly or via a network (e.g., a Local Area Network, Wide Area Network, etc.). The on-board user device 112 may have one or more displays and/or user interface (UI) to enable interaction with the on-board user 114. For example, the on-board user device 112 may be a computing device, smartphone, tablet, panel display, etc. that is known or heretofore contemplated.

The communications system 104 is configured to send and receive data over the network 116 with the off-board systems 118. The off-board systems 118 are configured to process these communications and to send and receive data with the off-board user device 120. The off-board user device 120 may have one or more displays and/or UI to enable interaction with the off-board user 122, and may be a similar computing device as described in connection with the on-board user device 112.

As described above, automated vehicle systems may perform control operations usually performed by the PF in traditional flights. In FIG. 1, these control operations are represented by the control system 106. The control system 106 may also be referred to herein as an AI control system or an AI vehicle control system. In one example, the control system 106 is intended to perform as the AF system described above to control operations of the aircraft 102. Likewise, the monitoring system 108 may be referred to herein as an AI monitoring system or an AI vehicle monitoring system. In one example, the monitoring system 108 is intended to perform as an AM system to provide the same level of supervisory redundancy as in human commercial flight/vehicle operation procedures. The techniques described herein describe how the monitoring system 108 and the control system 106 operate to provide the proper level of redundancy and shared mental state between the AF system and the AM system.

Figure 2A:
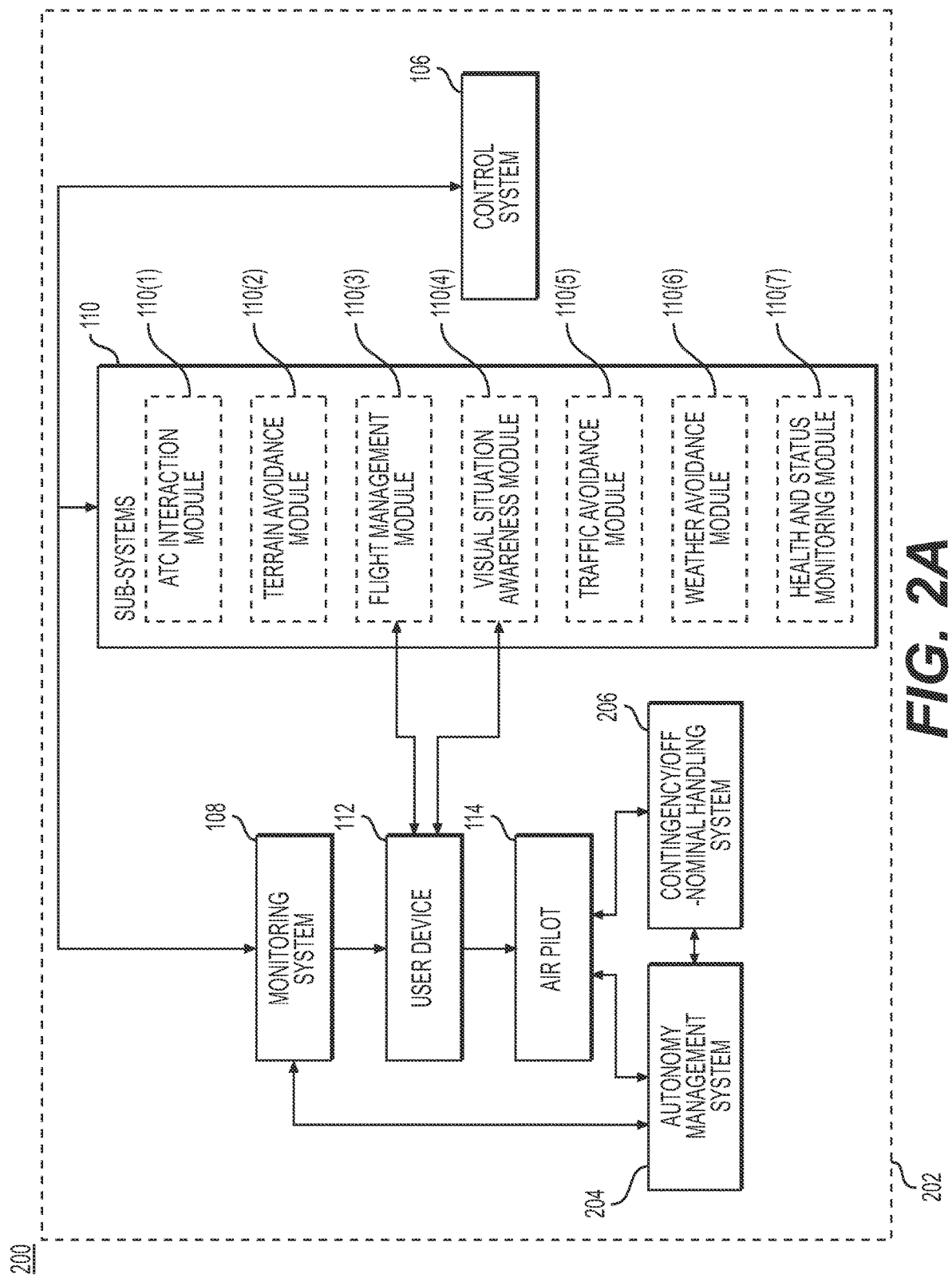

Reference is now made to FIG. 2A. FIG. 2A shows a first example embodiment of a system 200 for aircraft communications. The system 200 shows an aircraft 202 with the control system 106 and the monitoring system 108 described in connection with FIG. 1, above. FIG. 2A also shows the sub-systems 110 with a plurality of sub-system modules, shown at reference numerals 110(1)-110(7). It should be appreciated that the sub-system modules 110(1)-110(7) are not an exhaustive list of systems/modules that comprises the sub-systems 110. Additionally, it should be appreciated that the sub-system modules 110(1)-110(7) may be logic or computer readable instructions (e.g., software or firmware) stored on one or more physical devices and executed by a processor to perform the functionality of the modules. FIG. 2A also shows the user device 112 described in connection with FIG. 1 above and the on-board user 114 who may be human flight crew member, such as a skilled air pilot or an unskilled air pilot. Additionally, FIG. 2A shows an autonomy management system 204 and a contingency/off-nominal handling system (herein "contingency system") 206. The autonomy management system 204 and the contingency system 206 are in communication with the monitoring system 108. The autonomy management system 204 and the contingency system 206, alone or in combination, may be referred to herein as a management system.

Referring back to the sub-systems 110(1)-110(7), FIG. 2A shows an air traffic control (ATC) interaction module 110(1), a terrain avoidance module 110(2), a flight management module 110(3), a vehicle situation awareness module 110(4), a traffic avoidance module 110(5), a weather avoidance module 110(6), and a health and status monitoring module 110(7). The ATC interaction module 110(1) provides information about communications or instructions exchanged between ATC and the aircraft. The terrain avoidance module 110(2) provides information about ground terrain along the aircraft's flight path. The flight management module 110(3) provides information about the current flight status. The visual situation awareness module 110(4) provides information about visibility conditions along a flight path. The traffic avoidance module 110(5) provides information about air traffic along the aircraft's flight path and general vicinity. The weather avoidance module 110(6) provides information about weather conditions in the aircraft's vicinity and flight path. The health and status monitoring module 110(7) provides information about health conditions of the flight crew. It should be appreciated that these are merely examples, and the modules may provide additional functionalities.

The modules 110(1)-110(7) send data and information to the control system 106 to aid the control system 106 in making appropriate control decisions for navigation and control of the aircraft 202. The modules 110(1)-110(7) may collect and send information of situational circumstance of the aircraft 202 during aircraft operations. For example, the control system 106 may receive data from the weather avoidance module 110(6) and, based on this data, the control system 106 may adjust a flight path or other controls of the aircraft 202.

The monitoring system 108 also receives data and information from the modules 110(1)-110(7) of the sub-systems 110. The monitoring system 108 analyzes the information from the sub-systems 110 as well as control information it receives from the control system 106 to determine a control result and to provide an assessment of the overall control status of the aircraft.

The interaction between the monitoring system 108, the sub-systems 110, and the control system 106 enable the monitoring system to operate as a hierarchical pervasive monitoring system (e.g., the AM) to assess individual aircraft sub-systems, the state and decision making of the control system 106 (e.g., the AF), aircraft attitude and environmental factors, and intelligent integration of this data at holistic system levels to provide suggestions and recommendations to the control system 106 as necessary (e.g., suggestions to modify one or more control operations of the aircraft). The monitoring system 108 operates by integrating information from the components of the aircraft system 200 to produce a singular understanding of the aircraft, and may be activated or triggered when the control system 106 makes an unexpected control action, or fails to act when it is appropriate to do so. For example, the control system 106 may divert or deviate a planned aircraft flight path in response to information obtained from the traffic avoidance module 110(5). The diversion may activate the monitoring system 108 to collect data from the modules 110(1)-110(7) in the sub-systems 110 and from the control system 106 to verify and assess the appropriateness of the control system's actions. Additionally, the monitoring system 108 may provide recommendations to the control system 106 and the on-board user 114 (e.g., via the user device 112). The monitoring system 108 may monitor one or more modules 110(1)-110(7) of the sub-systems 110 and other contextual flight information to determine whether a corrective action should have been taken by the control system 106. For example, the monitoring system 108 may determine that a corrective action should be taken by the control system 106 when an analysis of the control result by the monitoring system 108 deviates from an expected control result based on information received from one or more of the modules 110(1)-110(7) or the control system 106, or both.

In one example, the monitoring system 108 accepts a continuous stream of diagnostic information from one or more of the modules 110(1)-110(7) as well as environmental data from aircraft sensors and external sources (some of which may not be represented by the modules 110(1)-110(7)). The monitoring system 108 converts the data to a standard format, and the information and trends of the data may be aggregated so that the monitoring system 108 may be configured to perceive concurrent trends and anomalies in multiple sub-systems and reliably predict the probability of future faults and failures. The monitoring system 108 may then combine this information with experiential data based on flight history, a database of known and predicted risks associated with concurrent and cascading faults and failures, and preloaded troubleshooting guidance to determine one or more courses of action to preempt the fault or failure. The possible actions may be prioritized and provided in a standardized format to the control system 106 (e.g., by the autonomy management system 204 or the contingency system 206). The control system 106 makes the final decision based on situational and scenario specific knowledge and carries out a decided action. The process aligns with the current operational paradigm where the human PM collates multiple sources of diagnostic data and presents a knowledgeable recommendation to the PF for final decision and subsequent control action.

The monitoring system 108 may update the autonomy management system 204 and the contingency system 206 with these determinations, assessments and recommendations. In one example, the autonomy management system 204 is a supervisory monitor that utilizes machine learning and/or decision logic to determine the root cause of the failures and outputs a diagnosis and recommendation for an appropriate course of action. The autonomy management system 204 is perceived by the monitoring system 108 by aggregating inputs from the diagnosis of the sub-systems 110. Thus, the autonomy management system 204 serves to support assessment of the control system 106 as well as decision logic employed in the event of an off-nominal system condition determined by the contingency system 206. Thus, the autonomy management system 204, together with the monitoring system 108, provide supervisory situational awareness functions.

In one example, the monitoring system 108 communicates to the control system 106 when any one of the following information is present: an informed deduction about the overall condition of the aircraft 202, detections of unusual control activity executed by the control system 106, prompts to engage flight control in response to a detected physical, communication, or environmental cue, and/or suggestions for addressing an off-nominal condition or situation. The monitor system 108 communicates necessary and relevant information regarding the overall system condition, environmental condition, and/or current control system 106 status to the autonomy management system 204 and for display by a device, e.g., the user device 112, to the on-board user 114, or the off-board user device 120 to an off-board user 122 (shown in FIG. 1). The autonomy management system 204 sends this information to the contingency system 206. In one example, the monitoring system 108 may send the information to the autonomy management system 204, the contingency system 206, and/or the control system 106 to instruct a modification of one or more control operations of the aircraft 202.

Reference is now made to FIG. 2B, which shows a second example embodiment of a system 250 for aircraft communications. The system 250 shows components similar to FIG. 2A with modifications. In FIG. 2B, the aircraft 252 has on-board components including the control system 106, the monitoring system 108, and the sub-systems 110, including the modules 110(1)-110(7). In FIG. 2B, the autonomy management system 204 and contingency system 206 are located off-board from the aircraft 252, and are in communication with the monitoring system 108 via the network 116 and the communications system 104 on-board the aircraft 252. FIG. 2B also shows an off-board user 122 (as described in FIG. 1) who may be a ground pilot or a ground controller of the aircraft, and the off-board user device 120 (as described in FIG. 1).

In FIG. 2B, the communications between the monitoring system 108 and the autonomy management system 204 and contingency system 206 happen via network communications. The monitoring system 108 in FIG. 2B supports the assessment of the control system 106 using the same or similar methodologies described in connection with FIG. 2A, and shares the information with the off-board components of system 250 over the network 116. This enables an "on-the-ground" controller to receive the assessments of the monitoring system 108 (e.g., via the off-board user device 120).

Reference is now made to FIG. 2C, which shows a third example embodiment of a system 270 for aircraft communications. The system 270 shows multiple aircraft 272(a)-272(n). Each of the aircraft 272(a)-272(n) has corresponding onboard sub-systems and control system (e.g., sub-systems 110(a) and control system 106(a) for aircraft 272(a), sub-systems 110(b) and control system 106(b) for aircraft 272(b), and so on). Each aircraft also has communications system, as described herein, not shown in FIG. 2C. The monitoring system 108 in FIG. 2C is depicted as being off-board the aircraft 272(a)-272(n), though it should be appreciated that each aircraft 272(a)-272(n) may have its own monitoring system performing the functionalities described herein. As shown in FIG. 2C, the monitoring system 108 is off-board and is configured to perform the same or similar methodologies for assessment of multiple control system 106(a)-106(n). The monitoring system 108 may be configured to communicate with the autonomy management system 204 and contingency system 206 and ultimately may provide the information and updates to an off-board user 122 (e.g., ground dispatch 203) via a user device 120, as described by the techniques herein. The system 270 in FIG. 2C thus enables an "on-the-ground" dispatch to receive control assessments from the monitoring system 108 of multiple aircrafts 272(a)-272(n) for effective control monitoring and decision making for one or more autonomous aircrafts.

In FIGS. 2A-2C, the monitoring system may communicate to a user (e.g., an on-board user or an off-board user) via an existing diagnostic or navigational display or a standalone display with automated crew components. The diagnostic or navigational display or the standalone display may be represented by one of the user devices 112/122 in FIGS. 2A-2C. For example, a diagnostic or navigational display may have a multi-modal component (tactile or voice) to cue the operator/user to look at the display. The human operator/user will be required to approve certain control actions and changes in navigation, and should be alerted if there is an impending fault or failure that is unlikely to be resolved before it occurs. Decision logic will be used to determine when and if to alert the human operator. As an example of this feature, when the battery is draining at a faster rate than expected, the monitoring system 108 may alert the control system 106 to turn off non-essential electronics in the flight deck of the aircraft. If this action is expected to alleviate the condition with ample reserve power prior to landing, the human operator may not be alerted unless the operator is affected by the change. If the battery power continues to drain quickly or if the drain accelerates, the human operator may be alerted that the aircraft may need to find an alternate suitable skyport or airport for landing and maintenance. Thus, the monitoring device 108 may enable display messages to be sent to display devices for users of the aircraft, and the display message may comprise information about the control assessments and suggestions to modify control operations.

Figure 3:
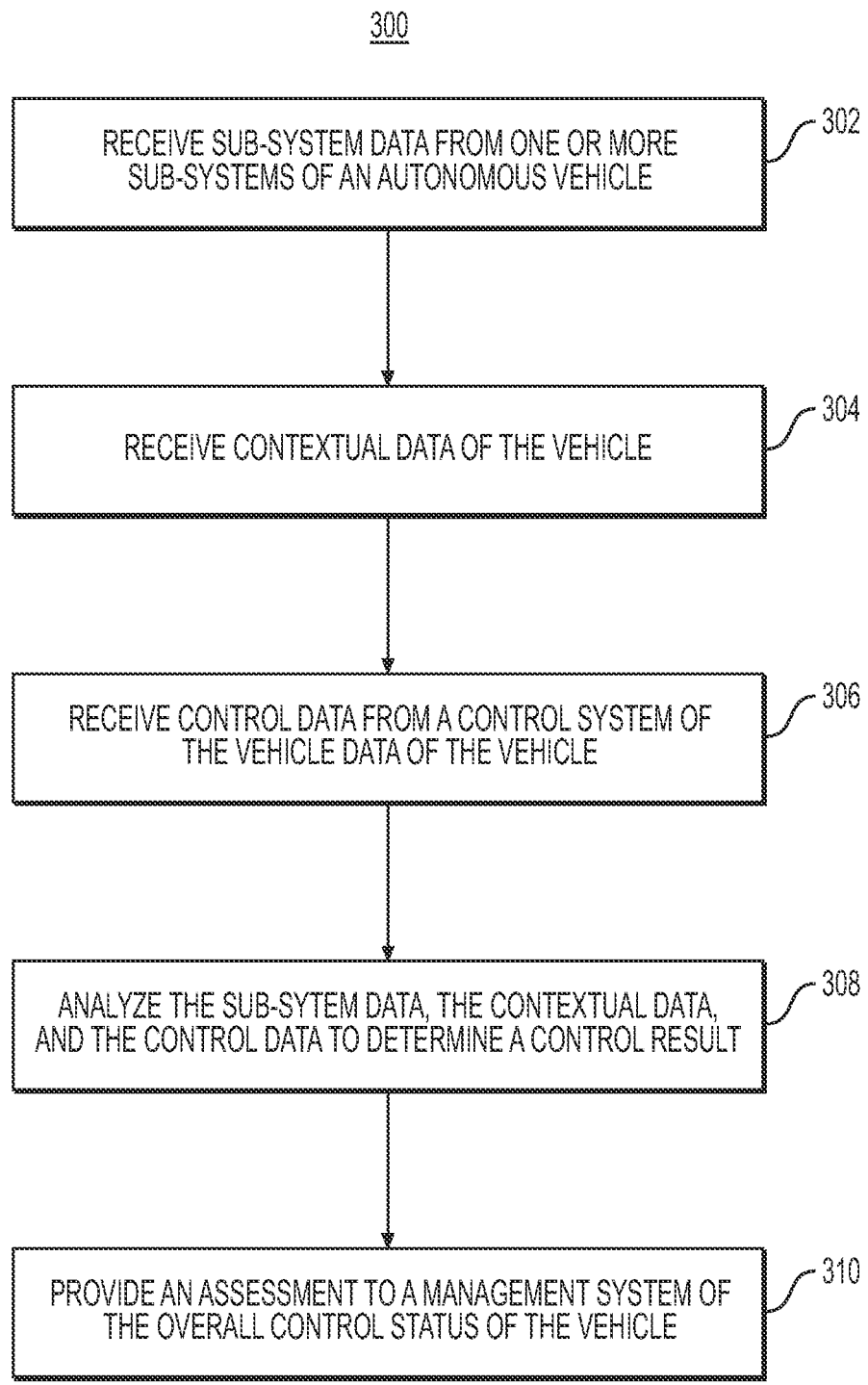
FIG. 3 depicts an example flow chart of a method for monitoring operations of an autonomous vehicle, according to techniques presented herein.

Reference is now made to FIG. 3, which shows a flow chart 300 of an exemplary method for monitoring operations of an autonomous vehicle. At step 302, the monitoring device 108 in communication with an autonomous vehicle (e.g., aircraft 102, 202, 252 and/or 272(a)-272(n)) receives sub-system data from one or more sub-systems of the vehicle. The sub-system data may be data from one or more of the modules 110(1)-110(7) or other components of the sub-system 110. At step 304, the monitoring device 108 receives contextual data of the vehicle. The contextual data comprises data of one or more situational circumstances of the vehicle during operation. At step 306, the monitoring device 108 receives control data from a control system (e.g., the control system 106) of the vehicle, and at step 308, the monitoring device analyzes the sub-system data, the contextual data, and the control data to determine a control result. At step 310, an assessment is provided to a management system of the overall status of the vehicle. The management system may be any one or more of the autonomy management system 204, the contingency system 206, and/or the control system 106.

Figure 4:
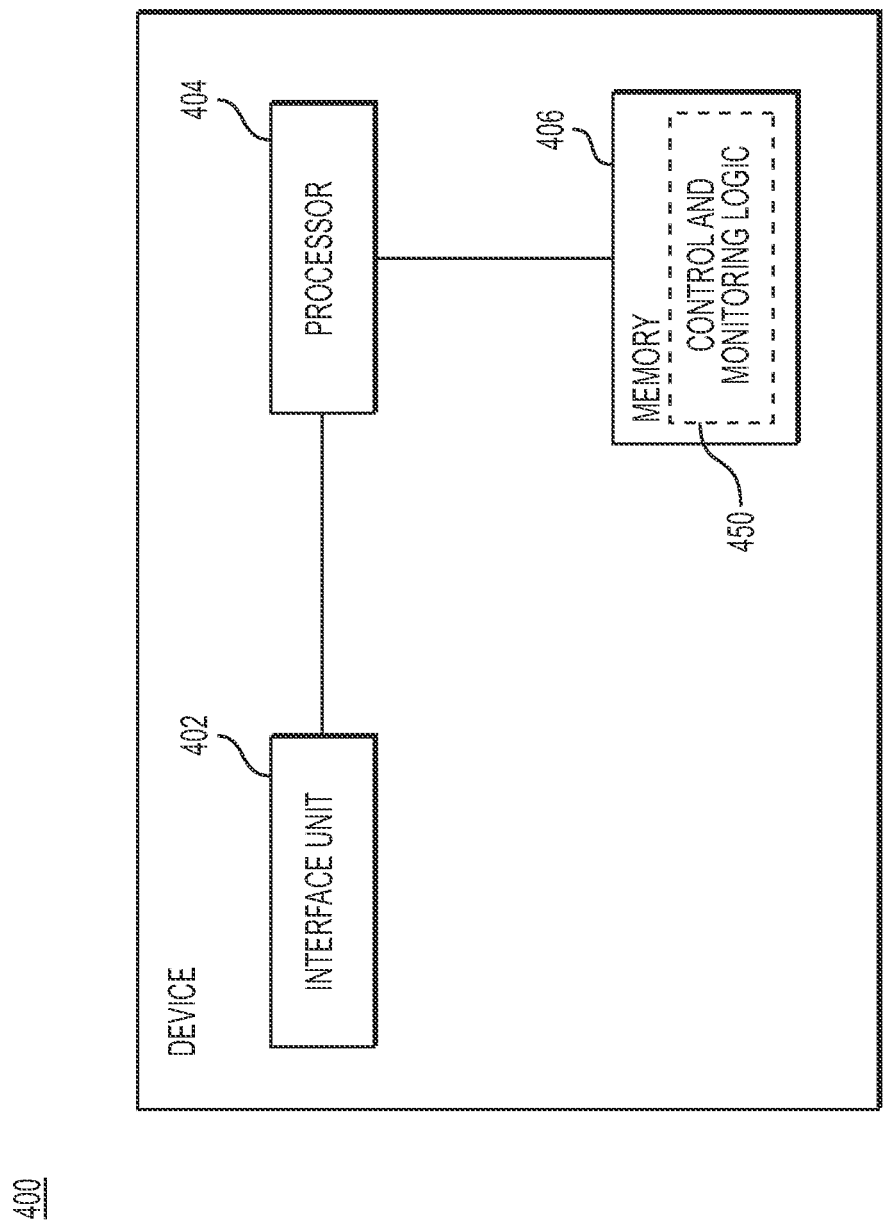
FIG. 4 depicts an example device for monitoring operations of an autonomous vehicle, according to the techniques presented herein.

FIG. 4 is a simplified functional block diagram of a device 400 that may be configured as any of the systems in FIG. 1 and FIGS. 2A-2C to execute the techniques described herein, according to exemplary embodiments of the present disclosure.

Specifically, in one embodiment, any of the aircraft systems, including the communications system 104, the control system 106, the monitoring system 108, the sub-systems 110, the off-board systems 118, the autonomy management system 204, and the contingency system 206 may be an assembly of device 400. In one example, the device 400 in FIG. 4 shows an interface unit 402, a processor 404, and a memory unit 406. The interface unit 402 is configured to send and receive data to one or more of the systems. For example, when the device 400 represents a device running logic for the functionality of the monitoring device 108, the interface unit may send and receive messages to the control system 106, the sub-systems 110, and the communications system 102. The processor 404 may be a central processing unit in the form of one or more processors, for executing program instructions. The device 400 may include an internal communication bus and a memory 406 configured for program storage and data storage for various data files to be processed and/or communicated, although the device 400 may receive programming and data via network communications. The memory 406 includes control and monitoring logic 450 that includes instructions that when executed by the processor 404 cause the processor to perform the operations of the monitoring system 108 or other systems described herein. The device 400 also may include input and output ports to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Any suitable system infrastructure may be put into place to allow for the assessment of models monitoring devices. In one embodiment, any of the disclosed systems, methods, and/or graphical user interfaces may be executed by or implemented by a computing system consistent with or similar to the descriptions herein. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for monitoring operations of an autonomous vehicle, the method comprising:
   receiving, by a monitoring device of a monitoring system of the autonomous vehicle, sub-system data from one or more of an air traffic control interaction module, a traffic avoidance module, and a flight crew health and status monitoring module;
   transmitting, by the monitoring device, data pertaining to one or more possible actions to an autonomy management system using machine learning and/or decision logic for determining a cause of failure and/or appropriate course of action, wherein the autonomy management system is configured to format the data pertaining to the one or more possible actions and transmit the formatted data to a control system;
   receiving, by the monitoring device, control data based on the formatted data from the control system;
   based on the control data and the sub-system data, providing, by the monitoring device, an assessment to the autonomy management system of an overall control status of the autonomous vehicle.

2. The method of claim 1, further comprising:
   receiving, by the monitoring device, contextual data of the autonomous vehicle, wherein the contextual data comprises data of one or more situational circumstances of the autonomous vehicle during operation by the control system, wherein the providing the assessment to the autonomy management system of the overall control status of the autonomous vehicle is further provided based on the control data, the sub-system data, and the contextual data.

3. The method of claim 1, further comprising:
   transmitting, by the monitoring device, the data pertaining to one or more possible actions to a contingency system including an off-nominal handling system.

4. The method of claim 1, further comprising:
   providing, by the monitoring device, one or more suggestions to the autonomy management system to instruct a modification of one or more control operations of the control system of the autonomous vehicle.

5. The method of claim 4, further comprising:
   sending, by the monitoring device, a display message to a display device for an operator of the autonomous vehicle, wherein the display message comprises information about the assessment and the one or more suggestions to the autonomy management system.

6. The method of claim 2, wherein the receiving the contextual data comprises receiving, as the contextual data, environmental data from sensors of the autonomous vehicle and external data of the operation of the autonomous vehicle by the control system.

7. The method of claim 6, wherein:
   the autonomous vehicle is an autonomous flight vehicle; and
   the external data comprises incoming control commands for the autonomous vehicle, weather information, deviations of a planned path of the autonomous vehicle, and traffic.

8. A monitoring device for a monitoring system of an autonomous vehicle, the monitoring device comprising:
   an interface unit configured to receive information;
   a data storage device storing instructions associated with vehicle data systems; and
   a processor configured to execute the instructions to:
      receive sub-system data from one or more of an air traffic control interaction module, a traffic avoidance module, and a flight crew health and status monitoring module;
      transmit data pertaining to one or more possible actions to an autonomy management system using machine learning and/or decision logic for determining a cause of failure and/or appropriate course of action, wherein the autonomy management system is configured to format the data pertaining to the one or more possible actions and transmit the formatted data to a control system;
      receive control data based on the formatted data from the control system;
      based on the control data and the sub-system data, provide an assessment to the autonomy management system of an overall control status of the autonomous vehicle.

9. The monitoring device of claim 8, wherein the processor is further configured to execute the instructions to receive contextual data of the autonomous vehicle, wherein the contextual data comprises data of one or more situational circumstances of the autonomous vehicle during operation by the control system, wherein the providing the assessment to the autonomy management system of the overall control status of the autonomous vehicle is further provided based on the control data, the sub-system data, and the contextual data.

10. The monitoring device of claim 8, wherein the processor is further configured to execute the instructions to transmit the data pertaining to one or more possible actions to a contingency system including an off-nominal handling system.

11. The monitoring device of claim 8, wherein the processor is further configured to execute the instructions to provide one or more suggestions to the autonomy management system to instruct a modification of one or more control operations of the control system of the autonomous vehicle.

12. The monitoring device of claim 11, wherein the processor is further configured to execute the instructions to send a display message to a display device for an operator of the autonomous vehicle, wherein the display message comprises information about the assessment and the one or more suggestions to the autonomy management system.

13. The monitoring device of claim 12, wherein the receiving the contextual data comprises receiving, as the contextual data, environmental data from sensors of the autonomous vehicle and external data of the operation of the autonomous vehicle by the control system.

14. The monitoring device of claim 13, wherein:
the autonomous vehicle is an autonomous flight vehicle; and
the external data comprises incoming control commands for the autonomous vehicle, weather information, deviations of a planned path of the autonomous vehicle, and traffic.

15. A non-transitory computer-readable medium storing instructions that, when executed by a processor of a monitoring device of a monitoring system of an autonomous vehicle, cause the processor to perform a method for monitoring operations of the autonomous vehicle, the method comprising operations to:
receive sub-system data from one or more of an air traffic control interaction module, a traffic avoidance module, and a flight crew health and status monitoring module;
transmit data pertaining to one or more possible actions to an autonomy management system using machine learning and/or decision logic for determining a cause of failure and/or appropriate course of action, wherein the autonomy management system is configured to format the data pertaining to the one or more possible actions and transmit the formatted data to a control system;
receive control data based on the formatted data from the control system;
based on the control data and the sub-system data, provide an assessment to the autonomy management system of an overall control status of the autonomous vehicle.

16. The non-transitory computer-readable medium of claim 15, further comprising instructions that cause the processor to receive contextual data of the autonomous vehicle, wherein the contextual data comprises data of one or more situational circumstances of the autonomous vehicle during operation by the control system, wherein the providing the assessment to the autonomy management system of the overall control status of the autonomous vehicle is further provided based on the control data, the sub-system data, and the contextual data.

17. The non-transitory computer-readable medium of claim 15, further comprising instructions that cause the processor to transmit the data pertaining to one or more possible actions to a contingency system including an off-nominal handling system.

18. The non-transitory computer-readable medium of claim 15, further comprising instructions that cause the processor to provide one or more suggestions to the autonomy management system to instruct a modification of one or more control operations of the control system of the autonomous vehicle.

19. The non-transitory computer-readable medium of claim 18, further comprising instructions that cause the processor to send a display message to a display device for an operator of the autonomous vehicle, wherein the display message comprises information about the assessment and the one or more suggestions to the autonomy management system.

20. The non-transitory computer-readable medium of claim 19, wherein:
the receiving the contextual data comprises receiving, as the contextual data, environmental data from sensors of the autonomous vehicle and external data of the operation of the autonomous vehicle by the control system;
the autonomous vehicle is an autonomous flight vehicle; and
the external data comprises incoming control commands for the autonomous vehicle, weather information, deviations of a planned path of the autonomous vehicle, and traffic.

* * * * *